United States Patent [19]

Ballinger

[11] 4,145,697

[45] Mar. 20, 1979

[54] GRAPHIC RECORDING APPARATUS WITH STYLUS ADDRESSING BY SHIFT REGISTERS

[75] Inventor: Dale O. Ballinger, Denver, Colo.

[73] Assignee: Honeywell Inc., Minneapolis, Minn.

[21] Appl. No.: 865,230

[22] Filed: Dec. 28, 1977

[51] Int. Cl.² .................. G01D 9/12; G01D 15/06
[52] U.S. Cl. .......................... 346/35; 346/165
[58] Field of Search ............. 346/35, 165, 162–164, 346/155

[56] References Cited

U.S. PATENT DOCUMENTS

| | | | |
|---|---|---|---|
| 2,933,364 | 4/1960 | Campbell | 346/35 X |
| 3,394,383 | 7/1968 | Lloyd | 346/35 X |
| 3,438,057 | 4/1969 | Neitzel | 346/107 |
| 3,846,801 | 11/1974 | Dumont | 346/165 |

Primary Examiner—Joseph W. Hartary

Attorney, Agent, or Firm—Laurence J. Marhoefer; Lockwood D. Burton; George E. Bodenstein

[57] ABSTRACT

A group of serial-in, parallel-out shift registers has a separate output positionally corresponding to each of the pins of a multipin recording head which is maintained in marking relationship with a moving electro-sensitive record sheet. Each of the shift register outputs is connected to the corresponding one of the pins by way of a pin-driving transistor which energizes its pin when a logic zero appears in the corresponding shift register output. A binary number to pin position decoder receives a binary number representing an analog input signal and repeatedly serially shifts corresponding binary bit trains into the shift registers. Due to the time required for an energized pin to mark the sheet, logic zero bits shifted into the registers cause pins to mark the sheet only after those bits are in their final loaded positions in the shift registers at the completion of each shifting operation.

5 Claims, 1 Drawing Figure

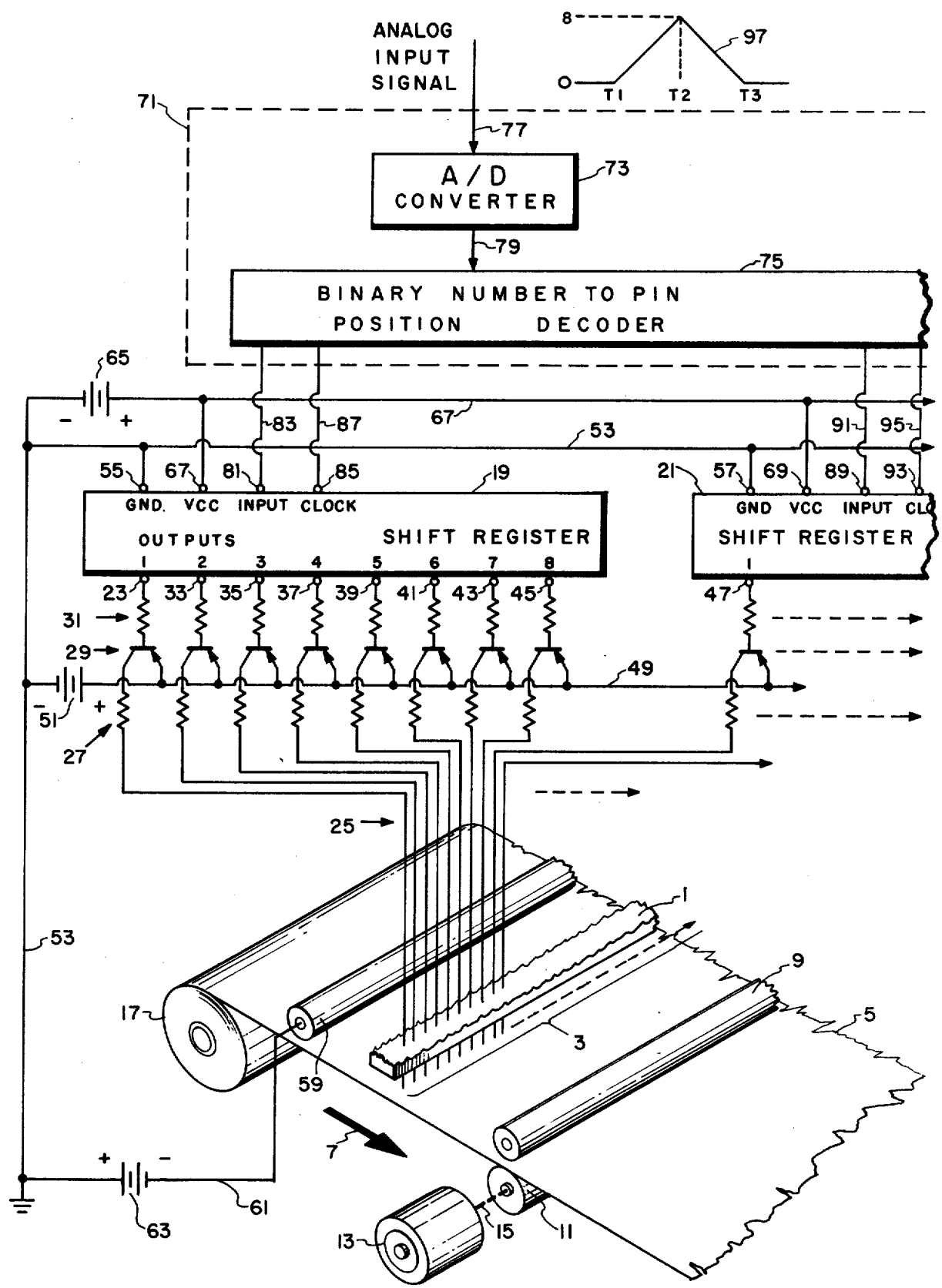

GRAPHIC RECORDING APPARATUS WITH STYLUS ADDRESSING BY SHIFT REGISTERS

BACKGROUND OF THE INVENTION

1. Field Of The Invention

The present invention relates generally to graphic recording apparatus of the type in which the records are made on a moving elongated record medium or sheet by a stationary multistylus or multielement recording head having a plurality of recording or marking elements which lie in a path across the sheet in marking relation thereto. Specifically, the invention relates to multielement recording apparatus as just described wherein the elements are selectively energized or placed in the marking condition by element addressing means which are in the form of digital logic devices, and wherein the latter operate in response to applied data input signals so that the resulting marks together form on the moving sheet recorded records or traces which are representative of the input signals. More specifically, the invention relates to that form of the last-noted type of apparatus, such as electrographic or electrosensitive recording apparatus, for example, in which the operation of a marking element to mark the sheet takes a finite time following the addressing or energization of that element.

2. Description Of The Prior Art

Recording apparatus of the form last identified above is well known in the art. An important example of that form of apparatus is the so-called electrosensitive recording apparatus wherein the marking elements are in the form of electrically conducting styli, hereinafter referred to as pins, and wherein the record sheet consists of a substrate, such as paper, which is coated with a thin layer of an electrically conductive material, such as aluminum. In the interest of clarity and simplicity of disclosure, the present invention will be considered and treated herein as it applies to such electrosensitive recording apparatus as used to make a recorded curve or trace representing an applied electrical input signal. It is to be understood, however, that the invention is not limited to electrosensitive recording apparatus, but instead is applicable as well to other versions of the above-noted form of multielement recording apparatus which requires a finite time between the addressing and corresponding marking actions. Also, it is to be understood that the invention is applicable to such apparatus when used to produce recorded alpha-numeric characters, images, etc., as well as curves or traces.

In the above-noted known electrosensitive recording apparatus, the pins lie in one or more lines in the path across the width of the moving electrosensitive record sheet, and together make up a multipin recording head. The pins are maintained in suitable electrical contact with the surface of the conductive coating on the sheet. A common electrode is also maintained in electrical contact with the surface of the sheet coating, and is usually in the form of an electrically conductive roller which extends across the sheet either upstream or downstream of the pin path.

The above-noted pins are individually connected to addressing means which receive the input signal to be recorded. When a pin is to mark the sheet, the addressing means causes a voltage to be applied between the common electrode and that pin. This action is referred to herein as energizing or addressing that pin. The energizing voltage causes a current to flow from the addressed pin into the conductive sheet coating, and that current, in due course, vaporizes that part of the coating which is then under the energized pin. This action removes said part of the coating, and there exposes the substrate. The latter has a color which contrasts with the conductive coating so that the noted vaporization and removal of the coating leave a contrasting mark on the sheet. Thus, when the addressing means addresses a pin, that pin in due course produces its mark on the sheet. The addressing means so collectively addresss the pins that the recorded marks on the moving sheet together form a recorded trace which represents the applied input signal.

Examples of such known electrosensitive recording apparatus are those which are disclosed in the Degonde et al U.S. Pat. No. 3,381,300 and in the Peterson U.S. Pat. application Ser. No. 774,940, filed on March 7, 1977. Although such apparatus performs its recording operations in a generally satisfactory manner, there has been a need for an improved form of such apparatus wherein the addressing means is of a relatively simpler construction than those of the known apparatus.

SUMMARY OF THE INVENTION

Accordingly, it is an object of the present invention to provide improved multielement recordng apparatus, such as electrosensitive recording apparatus, including a novel form of addressing means which is characterized by its simplicity.

To the end of accomplishing the above-noted and other desirable objects, the improved apparatus according to the present invention includes serial-in, parallel-out shift registers as the primary means for controlling the addressing of the marking elements.

BRIEF DESCRIPTION OF THE DRAWING

A better understanding of the present invention may be had from the following detailed description when read in connection with the accompanying drawing, wherein the single FIGURE shows electrosensitive recording apparatus which embodies the invention.

DETAILED DESCRIPTION

The Apparatus Of The Drawing

The apparatus shown in the drawing illustrates a preferred example of the above-noted improved recording apparatus embodying the present invention. The purpose of this apparatus is to provide a recorded trace on a moving elongated electrosensitive record sheet, which trace represents the variation with time of an analog input signal which is applied to the apparatus.

To this end, the illustrated apparatus includes a multipin recording head 1 having a plurality of pins 3 which lie in a line extending along the length of the head 1. These pins are maintained in electrical contact with the surface of the electrically conductive coating on an electrosensitive record sheet 5 which is moved at a desired constant velocity in the direction of the arrow 7 along a path which is normal to the length of the head 1 and to the line of pins 3. The sheet 5 is so moved across and in contact with the line of pins 3 by rollers 9 and 11 which extend across the width of the sheet 5. Roller 9 is an idler roller, and roller 11 is a sheet-moving or driving roller which is rotatively driven by a sheet drive motor 13 through the medium of a suitable mechanical linkage 15. The construction is such that the drive roller 11 pulls the sheet 5 from a sheet supply roll 17, moves the sheet 5 past the pins 3, and then delivers the sheet outward from the apparatus to the right as viewed in the drawing.

The head 1 is shown in the drawing in schematic form, and is only partially shown, in order to avoid undue complication of the drawing. Also to this end, only the first ten of the pins 3 and their electrical connections have been shown in the drawing, and only portions of the width of the sheet 5 and the roller 9 have been shown. In practice, the head 1 would extend across the entire width of the sheet 5, and would be provided with the pins 3 all along its length. The head 1 may be of any of the known forms of such heads, such as the form shown in the above-listed patent wherein the pins lie in a single line, and such as the forms shown in the above-listed application and in the Peterson U.S. Pat. No. 4,052,714 wherein the pins lie in more than one line along the head.

The pins 3 are addressed — that is, selectively energized and placed in their marking condition — by a plurality of serial-in, parallel-out shift registers which energize the pins through the medium of corresponding shift register output terminals and corresponding pin-driving transistors. Thus, each of the pins 3 is connected by way of an individual driving transistor to a corresponding one of the output terminals of a corresponding one of the shift registers. For convenience, each of those shift registers is of the standard 8-bit type, whereby the number of such registers is equal to one-eighth the number of the pins 3 which are included in the head 1. For example, on the assumption that the head 1 includes a total of four hundred of the pins 3, it follows that the apparatus includes a total of fifty of the 8-bit shift registers.

Since only the first ten of the pins 3 and their connections are shown in the drawing, only the first and a part of the second of the shift registers are shown in the drawing. These illustrated shift registers are those which include the output terminals which are individual to the illustrated first ten of the pins 3. The shift register which is individual to the first eight of the pins 3 is identified in the drawing by the reference numeral 19, while the shift register which is individual to the 9th and 10th pins, and to the following six pins, is identified in the drawing by the reference numeral 21.

In accordance with the foregoing, the first of the pins 3, which is the pin that is at the extreme left-hand end of the head 1 as shown in the drawing, is connected to the first ouptut terminal 23 of the shift register 19 by a driving transistor connection which can be treated from said first pin and through the first of a plurality of conductors 25 and the first of a plurality of resistors 27 to the collector of the first of a plurality of driving transistors 29. This driving connection also includes the connection of the base of the last-mentioned transistor through the first of a plurality of resistors 31 to the terminal 23.

In a similar manner, each of the second through the eighth of the pins 3 is connected by a corresponding one of the conductors 25, corresponding ones of the resistors 27 and 31, and a corresponding one of the transistors 29 to a corresponding one of the second through the eighth of the output terminals 33, 35, 37, 39, 41, 43, and 45 of the shift register 19. Likewise, the 9th one of the pins 3 is connected through its conductor 25, resistors 27 and 31, and transistor 29 to the first output terminal 47 of the shift register 21. Finally, each of the remaining ones of the pins 3 is connected through its conductor 25, resistors 27 and 31, and transistor 29 to a corresponding output terminal of the shift registers 21, etc. On the foregoing assumption that there is a total of four hundred of the pins 3, there are then four hundred of each of the conductors 25, the resistors 27 and 31, the transistors 29, and the shift register output terminals included in the apparatus.

The emitters of all of the transistors 29 are connected to a conductor 49 which, in turn, is connected to the positive terminal of a suitable source of D.C. voltage, shown as a battery 51. The negative terminal of the latter is connected to a common conductor 53 which, in turn, is connected to apparatus common or ground. The input or control connections for the transistors 29 are completed by the connection of the ground terminal of all of the shift registers to the common conductor 53. Said ground terminals include the terminal 55 of the shift register 19, and the terminal 57 of the shift register 21.

The construction which provides the actual marking currents for addressed ones of the pins 3 includes an electrically conductive roller 59 which extends across the sheet 5 and which is maintained in electrical contact with the surface of the conductive coating of the sheet 5. The roller 59 is connected by a conductor 61 to the negative terminal of a suitable source of D.C. marking voltage, shown as a battery 63. The positive terminal of the latter is connected to the common conductor 53. This construction establishes a transistor — controlled marking current path through each of the pins 3.

The connections described above cause each of the transistors 29 to be controlled by the signal on the corresponding one of the shift register output terminals so as to control, in turn, the energization and marking current of the corresponding one of the pins 3. To this end, those connections include a control path for each of the transistors 29, and include a controlled marking current path for each of said transistors and its corresponding one of the pins 3. With respect to the first of the pins 3, for example, the corresponding control path can be traced from the positive terminal of the battery 51 and through the conductor 49, the emitter-base path of the first of the transistors 29, and the first of the resistors 31 to the shift register output terminal 23, thence through the circuitry of the shift register 19 to the ground terminal 55, and finally through the conductor 53 back to the negative terminal of the battery 51. Also with respect to said first pin, the corresponding marking current path can be traced from the positive terminal of the battery 63 and through the conductor 53, the battery 51, the conductor 49, the emitter-collector path of the first of the transistors 29, the first of the resistors 27, and the first of the conductors 25 to the first of the pins 3, and from there through the coating on the sheet 5, the roller 59, and the conductor 61 back to the negative terminal of the battery 63.

By virtue of the above-described connections, a logic low or zero on any of the shift register output terminals causes the corresponding one of the transistors 29 to be on and to pass marking current through the corresponding one of the pins 3. Conversely, a logic high or 1 on any of the shift registers output terminals causes the corresponding one of the transistors 29 to be off and to prevent the flow of marking current through the corresponding one of the pins 3.

The energization of the shift registers is provided by a suitable source of D.C. energizing voltage, shown as a battery 65. The negative terminal of the latter is connected to the conductor 53 and thence to the ground terminals of the shift registers. The positive terminal of the battery 65 is connected to a positive supply conductor 67 which, in turn, is connected to the Vcc terminal of each of the shift registers. For the shift registers 19 and 21, these Vcc terminals are terminals 67 and 69.

The control of the shift registers, to cause them to address the pins 3 in accordance with the input signal, is provided by logic means 71. The latter are connected to receive the input signal and to produce a group of fifty binary bit trains representative of the then-existing value of the input signal. Each of these trains is individual to a corresponding one of the shift registers, and contains eight bits, each of which is individual to a corresponding one of the eight outputs of the corresponding one of the shift registers. Each of these trains is serially loaded, shifted, or clocked into the corresponding shift register by way of the input terminal of the latter. The bit pattern or sequence of each train, and the individual bit values, are made to be such that the loaded trains effect the energization of only those of the pins 3 whose marking action is required at the time to produce a trace portion which represents the then-existing value of the input signal. A new group of such trains is produced and loaded periodically, at a desired update or sampling rate.

In order to produce and load the above-noted successive groups of the eight-bit binary trains, the means 71 include an analog to digital (A/D) converter 73, and a binary number to pin position decoder 75. Within the means 71, the input signal is applied to the input of the A/D converter 73 by a connection 77, and the output of the converter 73 is connected to the input of the decoder 75 by a connection 79. The output of the decoder 75 is connected by means of conductors to the input and clock terminals of each of the shift registers. With respect to the shift register 19, the output of the decoder 75 is connected to the shift register input terminal 81 by a conductor 83, and is connected to the shift register clock terminal 85 by a conductor 87. With respect to the shift register 21, the output of the decoder 75 is connected to the shift register input terminal 89 by a conductor 91, and is connected to the shift register clock terminal 93 by a conductor 95. The converter 73 and the decoder 75 include conventional logic components arranged in the known manner to provide and load the above-noted binary bit trains. Only a portion of the decoder 75 is shown in the drawing, that portion being the portion to which the illustrated two shift registers 19 and 21 are connected to receive their bit trains and clock signals from the decoder 75.

THE OPERATION OF THE APPARATUS OF THE DRAWING

The novel operation of the illustrated apparatus in accordance with the present invention will now be described by reference to a typical operation example. For this example, let it be assumed that the input signal on the connection 77 rises and falls between a zero value and a value of eight units, such as millivolts, during a time period T1–T3, and that this occurs in the manner shown by the curve 97 which has been placed adjacent to the connection 77. Therefore, in this operation example, the apparatus is to produce a trace on the sheet 5 which is a reproduction of the curve 97.

In connection with the typical operation being described, let it also be assumed that the zero value of the input signal corresponds to a trace position on the sheet 5 at the left-hand edge thereof, which is the position at which the first of the pins 3 marks the sheet 5 when that pin is addressed. Similarly, let it be assumed that the input signal value of eight millivolts corresponds to a trace position on the sheet 5 at which the ninth of the pins 3 marks the sheet 5 when that pin is addressed.

While the apparatus is in operation, the converter 73 repeatedly digitizes the input signal which is on the connection 77, and thus maintains on the connection 79 a binary number which is the binary representation of the existing value of the input signal. The number of bits in this binary number is such as to uniquely identify each of the different positions across the sheet 5 at which the head 1 is capable of marking the sheet. The number of those positions is, of course, equal to the number of pins 3 which are included in the head 1. On the assumption that the head 1 contains four hundred of the pins 3, the binary number produced on the connection 79 would contain nine bits. Prior to the time T1, therefore, said binary number appears as a series of nine zeros, corresponding to the existing input signal value of zero.

In the presence of the last-noted binary number on the connection 79, the decoder 75 produces a corresponding group of fifty eight-bit trains repeatedly at the above-noted update rate. Upon the production of each of those groups, each of the trains thereof is concurrently serially shifted or clocked into the corresponding one of the shift registers by way of its input signal. In doing this, the decoder 75 makes the positions of the bits in each of said trains correspond to the positions of the pins which are connected to and controlled by the particular one of the shift registers to which that train is applied. The decoder 75 also makes the value of each of the bits of that train either a logic zero, hereinafter referred to simply as a one, depending upon whether the corresponding pin is, or is not, to be energized in producing the trace representing the current value of the input signal.

Prior to the time T1, therefore, the zero value of the input signal dictates that solely the first of the pins 3 is to be energized at this time. Consistent with this, and in the time period preceding the time T1, the number on the connection 79 causes the decoder 75 to serially shift a train of one zero and seven ones (01111111) into the shift register 19 by way of the input terminal 81, and concurrently to serially shift an individual train of eight ones into the input terminal of each of the others of the shift registers. Consequently, each of the shift registers now contains a bit train or data word which represents which of the pins that are controlled by that shift register are to be energized during said period.

The presence of the bit train 01111111 in the shift register 19 causes the first of the pins 3 to be energized, whereby at a time after the zero bit of that train has arrived at the output terminal 23, said first pin marks the sheet 5. This elapsed time or time delay between pin addressing and marking may well be of the order of thirty to fifty microseconds. The presence of the one bits of the last-noted train at the output terminals 33, 35, 37, 39, 41, 43, and 45 prevents the rest of the first eight of the pins 3 from being energized.

Similarly, the bit trains 11111111 now in each of the others of the shift registers prevent the remainder of the pins 3 from being energized. Consequently, only said first pin is addressed and marking up to the time T1, as is desired. As a result, up to the time T1, said first pin marks and records a line along the left-hand edge of the moving sheet 5 which represents the existing zero value of the input signal.

At the time T1, the input signal starts to rise linearly as shown by the curve 97. As the input signal so increases, the binary number on the connection 79 correspondingly increases. This causes the successive groups of bit trains which are produced and shifted into the shift registers 19 and 21 to correspondingly change along with the changing input signal so that one after the other of the first nine of the pins 3 is momentarily addressed as the time increases from T1 to T2.

As a result, the recorded trace follows the increasing input signal. At the time T2, for example, the bit train shifted into the shift register 19 consists of eight ones, the train concurrently shifted into the shift register 21 consists of a zero and seven ones (01111111), and the concurrent train for each of the remainder of the shift registers consists of eight ones. At the time T2, therefore, only the ninth of the pins 3 is addressed, corresponding to the input signal value of eight millivolts, and that pin alone then marks the sheet 5.

Following the time T2, the input signal decreases linearly as shown by the curve 97, returning to its intitial value of zero at the time T3. As the input signal so decreases, the binary number on the connection 79 correspondingly decreases, and the successive groups of bit trains which are produced and shifted into the shift registers are correspondingly changed to follow the decreasing input signal. Immediately following the time T2, for example, each of the bit trains shifted into the shift registers 21 and up consists of eight ones, and the train concurrently shifted into the shift register 19 consists of seven ones and a zero (11111110). Those trains cause only the eighth of the pins 3 to be addressed and to mark the sheet 5 at that time, as is desired.

As the input signal continues to decrease, one after the other of the seventh, sixth, etc., of the pins 3 is momentarily addressed, in accordance with succeeding ones of the trains loaded into the shift register 19, with the result that the recorded trace follows the decreasing input signal. Finally, at and after the time T3, the train loaded into the shift register 19 is again 01111111, each of the concurrent trains loaded into the shift register 21 and the remaining shift registers consists of eight ones, and solely the first of the pins 3 again marks the sheet 5 in correpondence with the zero value of the input signal.

In an equivalent manner, each value of the input signal, up to a full scale value of 399 millivolts, effects the loading into the shift registers of concurrent corresponding bit trains which cause the shift registers to address only the pin or pins which are needed to produce the corresponding trace portion at that time. For example, an input value of 399 millivolts causes each of the first forty-nine of the shift registers to be loaded with a train of eight ones, and causes the last of the shift registers to be loaded with a train 11111110. This causes only the extreme right-hand one of the pins 3 to mark the sheet 5, as is desired.

In summary, it is noted that each time that a new group of fifty trains is produced by the decoder 75, which occurs at the above-noted update rate, each of those trains is concurrently distributed to, and serially clocked into, its corresponding shift register, and the "parallel-out" operation of the latter energize the pins whose loaded bits call for such energization.

As a binary train such as the above-noted train 11111110 is being serially shifted into one of the shift registers, the shift register 19, for example, the zero of the train winds up in the proper position at the eighth output or output terminal 45, where it causes the eighth of the pins 3 to be energized, as is desired. However, in the process of being so shifted in, said zero also appears sequentially at the intermediate output terminals 23, 33, 35, 37, 39, 41, and 43. This means that the first seven of the pins 3 are unintentionally addressed as the noted train is being shifted into the shift register. Since this could lead to the production of undesired marks on the sheet 5, the herein described use of the shift registers has been generally avoided in the past.

I have discovered, however, that such unwanted marking of the sheet 5 is avoided by making practical use of the above-noted time delay or time which necessarily elapses between the addressing of a pin and the actual operation thereof to mark the sheet. This avoidance and use are accomplished by causing the clocking rate with which the trains are serially shifted into their shift registers to sufficiently high that, as a train is shifted in, any zero bits of the train pass by the intermediate output terminals at a sufficiently high rate that substantially no significant marking is done by the pins connected to those terminals. In other words, during a loading operation, the bits of a shifting train are made to pass by the intermediate outputs of the shift register with sufficient rapidity that any zeros pass by those intermediate outputs so quickly that the pins connected to those outputs do not have time to make unwanted marks on the sheet 5. By way of example, clocking rates of the order of fifteen megahertz have been found to be adequate to permit the hereindescribed use of shift registers for simplifying the addressing of the pins 3 without causing the latter to produce the above-noted unwanted marking of the sheet 5.

The apparatus which has been described herein has been described as loading the bit trains of a group into the several shift registers in a concurrent manner. It is to be understood, however, that the apparatus according to the invention could, as well, complete the serial shifting of each train into the corresponding one of the shift registers before starting to serially shift the next train of the group into the next shift register.

By way of illustration and example, and not by way of limitation, it is noted that typical components types and values for the illustrated apparatus are as follows:

Shift registers — type 74164
Transistors 29 — type MPS A56 (Motorola)
Resistors 27 — 100 Ohms
Resistors 31 — 400 Ohms
Battery 51 — 3 Volts
Battery 63 — 50 Volts
Battery 65 — 5 Volts.

Also, the decoder 75 may well include, in addition to the required clock, twenty-five type 74154 4 to 16 decoders and the required multiplexing logic.

It is believed to be clear from the foregoing description that the apparatus according to the invention fulfills the objects stated herein. Thus, it has been shown that such apparatus provides the necessary addressing of the marking elements of a multielement recording head with the use of only a relatively simple addressing means.

The embodiments of the invention in which an exclusive property or privilege is claimed are defined as follows:

1. In graphic recording apparatus including a record medium which is moved along a travel path relative to a plurality of marking elements which lie along an element path that is substantially normal to said travel path, each of said elements operating to record a corresponding mark on said medium after a time period following the time at which that elements is addressed, the improved means for addressing said elements to cause said marks to form a recorded trace on said medium which represents an applied input signal, comprising serial-in, parallel-out shift register means having serial input connections and having parallel output connections, each of the latter corresponding to a one of said elements, logic means connected to receive said input signal and responsive to the value thereof to produce on output means a plurality of binary bit trains wherein the order of the bits of said trains corresponds to the order of the positons of said elements along said element path and the values of said bits collectively represent the value of said input signal in terms of said element positions, connecting means connected between said output means and said serial input connections to cause said logic means to serially shift said trains into said shift register means, and an individual connection connecting each of said output connections to a corresponding one of said elements to cause each of said elements to be addressed when the loaded bit on the corresponding one of said output connections has a predetermined value, said logic means serially shifting said trains into said shift register means at a clock rate which prevents the shifting bits from causing addressed elements to produce said marks while said bits are shifting to their final loaded positions.

2. In electrosensitive recording apparatus including means for moving an electrosensitive record sheet along a sheet travel path across and in electrical contact with the row of pins of a multipin recording head, the improved means for addressing said pins to cause the latter to produce on said moving sheet a recorded trace which represents the variations with time in the value of an applied analog input signal, comprising a serial-in, parallel-out shift register having an input connection and having a number of separate outputs, each of which has an individual connection to a corresponding one of said pins to cause that pin to mark said sheet when a marking binary bit of a binary bit train has been placed on that output at the completion of the shifting of that train into said shift register, an analog to digital converter connected to receive said input signal and responsive thereto to produce a binary number corresponding to the existing value of said input signal, and a binary number to pin position decoder connected to said converter to receive said binary number and connected to said shift register input connection, said decoder being responsive to said binary number to serially shift a binary bit train into said shift register having a marking bit at a position in said train corresponding to the position of one of said pins which is to mark said sheet to record the existing value of said signal, said decoder shifting said train into said shift register at a clock rate which prevents the others of said pins from marking said sheet as said marking bit is shifted past those of said outputs connected to said others of said pins.

3. Apparatus as specified in claim 2, wherein each of said individual connections includes a corresponding transistor which is turned on by the presence of a one of said marking bits on the corresponding one of said outputs, and wherein each of said transistors, when on, completes a marking current path through said sheet and the corresponding one of said pins.

4. Graphic recording apparatus for producing a record of an input signal, including drive means arranged to move an electrosensitive record sheet along a sheet travel path, a multipin recording head having a plurality of pins maintained in electrically conducting marking relation to said sheet along a pin path which is substantially normal to said travel path, serial-in, parallel-out shift register means having input means and having a separate output terminal which is individual to each of said pins, decoder means connected to receive a binary number which represents an input signal, and having an output means in which said decoder means respond to said binary number to produce a plurality of binary bit trains wherein the bit order corresponds to the order of the positions of said pins along said pin path and each bit has one or another value depending upon whether that bit is or is not to cause the corresponding one of said pins to mark said sheet to record the value of said input signal, connecting means connected between said decoder output means and said shift register input means to cause said decoder means to serially shift said trains into said shift register means, and an individual connection connecting each of said output terminals to the corresponding one of said pins to cause each of said pins to pass a sheet-marking current when the loaded bit on the corresponding one of said output terminals has said one value, said decoder means shifting each of said trains into said shift register means at a clock rate which prevents the shifting bits of said one value from causing said current to mark said sheet until said train arrives at its fully loaded position in said shift register means.

5. Apparatus as specified in claim 4, wherein each of said individual connections includes an individual transistor which is turned on by the presence of a bit of said one value on the corresponding one of said output terminals, and wherein each of said transistors, when on, causes the corresponding one of said pins to pass said sheet marking current.

* * * * *